J. L. Winslow,
Shaft Coupling.

N° 58,330.  Patented Sep. 25, 1866.

Witnesses
William H. Clifford.
Henry C. Houston.

Inventor.
J. L. Winslow.

UNITED STATES PATENT OFFICE.

J. L. WINSLOW, OF PORTLAND, MAINE.

IMPROVEMENT IN SHAFT-COUPLINGS.

Specification forming part of Letters Patent No. 58,330, dated September 25, 1866.

*To all whom it may concern:*

Be it known that I, J. L. WINSLOW, of Portland, in the county of Cumberland and State of Maine, have invented a new and Improved Shaft-Coupling; and I do hereby declare the following to be a full, clear, and exact description thereof, which will enable others to make and use my invention, reference being had to the accompanying drawings, forming a part of this specification, in which—

Figure 3:
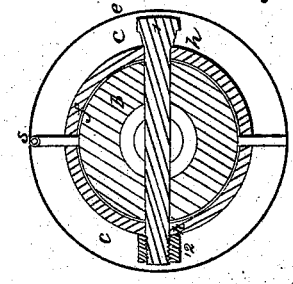
Figure 1:
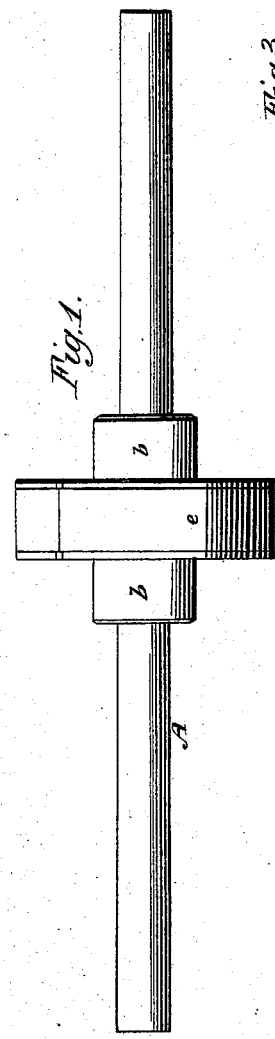
Figure 4:
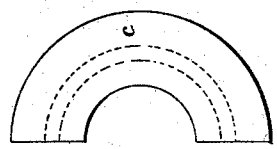
Figure 2:
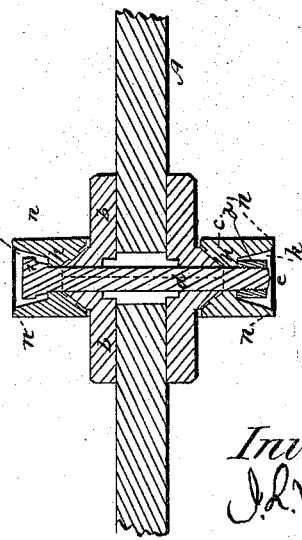

Figure 1 shows a side view of shafts connected by means of my improved coupling. Fig. 2 shows a vertical section of Fig. 1; Fig. 3, a transverse section of the same; Fig. 4, an exterior side view of one of the semi-collars.

Similar letters indicate like parts in all the figures.

Fatal accidents often occur from the use of machinery in which long lines of shafting are employed, in consequence of the projecting boltheads and nuts on the ordinary flange-coupling. Where numerous couplings are required a great proportion thereof cannot be guarded, or, at least, are supposed to be in a position not rendering a coupling necessary that shall be perfectly safe under all circumstances.

A method of uniting shafts which will combine simplicity, cheapness, safety, and ease of application to a considerable extent is, notwithstanding a number of inventions already made, a desirable improvement in this branch of common machinery.

The object of my invention is to attain in some degree these results.

My invention consists of the following parts, viz: Two flanges to fit on the ends of the shafts which are to be united; two semi-collars to embrace and confine the flanges; a bolt having a head, screw, and nut, said bolt passing through holes in the collars and slots in the flanges, being also at right angles to the shafts and between the ends of the same when brought together; a hoop of metal encompassing the collars and covering the head and nut of the bolt.

Particular reference to the drawings will illustrate the character, application, and arrangement of the different parts of my invention.

A shows shafts united by means of my improved coupling. *b* shows flanges secured to the ends thereof to be united. *c* shows the semi-collars; *d*, the bolt, having the head 1 and nut and screw 2. *e* shows the metal hoop which encompasses the collars.

The bearing-faces of the two flanges are beveled, as illustrated at *f*, Fig. 3, so that any side or sliding motion of the flanges is prevented.

Slots are made on the opposing faces of either flange, forming, when the flanges are impacted, a hole for the reception of the bolt. This is illustrated in Figs. 2 and 3. The form and position of the flanges when placed together are also illustrated in Fig. 2.

The inner faces of the semi-collars *c* are grooved in such manner as to fit and correspond to the size and shape of the flanges when placed over and around the same. This arrangement is clearly shown in Fig. 2.

Through both the semi-collars, as shown at *h*, is constructed a hole for the entrance of the bolt. The bolt passes through these holes, through the slots on the flanges by the ends of the shafts, and is secured by the nut 2.

The bolt-head and nut rest in a channel formed by two flanges around the circumference of the two semi-collars. This is indicated at *k*.

Around the periphery of the circle formed by the union of the two semi-collars is drawn the metallic hoop *e*. This hoop rests in a groove constructed to receive it, and indicated at *n*. The hoop is further confined by a hinge-joint having a removable bolt, and shown at *s*.

I am aware of the issue of Letters Patent to Samuel Hall, June 5, 1860, No. 28,573; but this invention differs from mine in combining with the cross-key slotted shafts and two longitudinal keys. I do not claim a coupling thus constructed.

The operation of my invention is as follows: When the faces of the two flanges have been placed in contact and the collars around the flanges, the bolt is passed through the holes in the collars and the slots in the flanges. Any degree of compression that is desired can thus be attained by turning the screw 2. The metallic hoop is then placed around the periphery of the collars, and fastened by the removable bolt.

What I claim as my invention, and desire to secure by Letters Patent, is—

The combination of the flanges, beveled and slotted, as described, the collars fitting thereupon, the bolt, and metallic hoop, all constructed, secured, and operating to form a coupling for shafts, as herein set forth.

J. L. WINSLOW.

Witnesses:
WILLIAM H. CLIFFORD,
HENRY C. HOUSTON.